United States Patent
Hehl et al.

(10) Patent No.: US 12,181,057 B2
(45) Date of Patent: Dec. 31, 2024

(54) GEOMETRICAL INFLUENCE ON NON-FLOW-FACING CLOSING-BODY REGIONS

(71) Applicant: ProMinent GmbH, Heidelberg (DE)

(72) Inventors: Gabriele Hehl, Bruhl (DE); Holger Ludwig, Neckarsteinach (DE); Maximilian Goepfert, Mannheim (DE); Martin Reinhard, Heidelberg (DE)

(73) Assignee: PROMINENT GMBH, Heidelberg (DE)

( * ) Notice: Subject to any disclaimer, the term of this patent is extended or adjusted under 35 U.S.C. 154(b) by 186 days.

(21) Appl. No.: 17/844,191

(22) Filed: Jun. 20, 2022

(65) Prior Publication Data

US 2022/0412475 A1 Dec. 29, 2022

(30) Foreign Application Priority Data

Jun. 25, 2021 (DE) .................. 10 2021 116 554.7

(51) Int. Cl.
*F16K 15/04* (2006.01)
(52) U.S. Cl.
CPC ........... *F16K 15/04* (2013.01); *Y10T 137/791* (2015.04); *Y10T 137/7914* (2015.04)
(58) Field of Classification Search
CPC .. F16K 15/04; F16K 15/048; F16K 2200/502; Y10T 137/791; Y10T 137/7914
See application file for complete search history.

(56) References Cited

U.S. PATENT DOCUMENTS

| 4,832,075 A | * | 5/1989 | Dubach ................. F16K 15/042 251/368 |
| 5,799,689 A | * | 9/1998 | Tang ...................... F16K 15/04 137/533.15 |
| 5,971,015 A | * | 10/1999 | Gonsior ................. F16K 15/04 137/533.19 |
| 2009/0223574 A1 | | 9/2009 | Montague |
| 2018/0291891 A1 | * | 10/2018 | Scopelite .............. F04B 53/126 |

FOREIGN PATENT DOCUMENTS

| DE | 1203557 A | 12/1960 |
| EP | 1106884 A2 | 6/2001 |

* cited by examiner

*Primary Examiner* — Kevin F Murphy
(74) *Attorney, Agent, or Firm* — PAUL & PAUL

(57) ABSTRACT

The present invention relates to a check valve, and to a device having a check valve, and to a method of cleaning a check valve. In order to provide a check valve or a device having a check valve or a method of cleaning a check valve, in which sufficient cleaning of the non-flow-facing regions of the valve closing body is also ensured, it is proposed according to the invention that an element reducing the flow cross-section is provided in a region of the opening stop in addition to the opening stop so that, when the valve closing body is in the open position and the fluid flows through the check valve counter to the blocking direction, a non-flow-facing region of the surface of the valve closing body has at least an average wall shear stress of 50% compared to an average wall shear stress of a flow-facing region of the surface of the valve closing body.

19 Claims, 4 Drawing Sheets

GEOMETRICAL INFLUENCE ON NON-FLOW-FACING CLOSING-BODY REGIONS

CROSS-REFERENCE TO RELATED APPLICATION

This application claims the priority of German Application No. 10 2021 116 554.7, filed on Jun. 25, 2021.

The present invention relates to a check valve having a valve housing, wherein the valve housing comprises an inlet and an outlet for a fluid, a valve seat having a sealing surface and an opening stop opposite the valve seat, wherein a valve closing body having a surface is arranged in an interior space of the valve housing between the valve seat and the opening stop, wherein the valve closing body can reciprocate relative to the valve housing between a closed position, in which the valve closing body is engaged with the sealing surface of the valve seat, and an open position, in which the valve closing body is engaged with the opening stop, wherein the valve closing body seals the check valve when fluid flows through the check valve in a blocking direction in that the valve closing body sealingly engages with the sealing surface of the valve seat.

The present invention furthermore relates to a device for conveying a fluid having a check valve of the type mentioned above, as well as to a method of cleaning a check valve arranged in a device for conveying a fluid.

Check valves play an essential role in conveying fluids. The necessary devices for conveying a fluid, in particular pumps, are frequently also used in areas in which certain hygienic requirements must be met. At this point, the food industry or medical technology is named by way of example.

Check valves installed in such devices are regularly particularly critical regions that are difficult to clean. In order to clean the check valves, they are typically impinged with a constant stream of a cleaning agent in a separate cleaning process. The constant impingement with the cleaning agent in a conveying direction counter to the blocking direction permanently brings the valve closing body into its open position, in which the valve closing body is engaged with the opening stop.

The static position of the valve closing body in this cleaning process results in the cleaning agent not sufficiently flowing around non-flow-facing regions of the valve closing body, such as the rear side of a valve closing body, the front side of which is directly facing the cleaning stream. This again results in insufficient cleaning of the entire valve closing body.

The object of the present invention is therefore to provide a check valve or a device having a check valve or a method of cleaning a check valve, in which sufficient cleaning of the non-flow-facing regions of the valve closing body is also ensured.

According to the invention, this object is achieved by a check valve of the type mentioned above, wherein an element reducing the flow cross-section is provided in a region of the opening stop in addition to the opening stop so that, when the valve closing body is in the open position and the fluid flows through the check valve counter to the blocking direction, a non-flow-facing region of the surface of the valve closing body has at least an average wall shear stress of 50% compared to an average wall shear stress of a flow-facing region of the surface of the valve closing body.

The element reducing the flow cross-section influences the fluid in its flow in such a way that, when viewed microscopically, a wall shear stress that allows sufficient cleaning also acts on the non-flow-facing region of the valve closing body. This is ensured with an average wall shear stress of at least 50% of the average wall shear stress acting on the flow-facing region.

Whether a surface portion of the valve closing body is assigned to the non-flow-facing region or the flow-facing region depends on the respective orientation of the surface portion relative to a conveying direction of the fluid in which the fluid flows through the check valve. Within the meaning of the present application, the non-flow-facing region is thus composed of such surface portions of the valve closing body, the surface normal of which comprises a component greater than zero in the conveying direction, when an imaginary coordinate system is arranged at a geometric centre of the valve closing body, the first and second quadrants of which coordinate system are downstream of the third and fourth quadrants in the conveying direction. In other words, the surface normals of the surface portions of the non-flow-facing region enclose an angle of less than 90° with the conveying direction. The surface normals of the surface portions of the flow-facing region, on the other hand, have a component less than zero counter to the conveying direction of the fluid. A fluid stream that flows through the check valve in the conveying direction therefore initially strikes the flow-facing region. The surface normals of the surface portions of the flow-facing region also enclose an angle less than 90° with the flow direction.

The extent to which a fluid flows around a surface portion of a body can be quantified using what is known as the wall shear stress. In fluid mechanics, the wall shear stress is understood to mean the force per area applied tangentially to a surface portion of the body due to the flowing fluid. This force is significantly reduced for surface portions of the non-flow-facing region in comparison to surface portions of the flow-facing region in check valves of the prior art so that cleaning of these portions by a cleaning agent flowing around them is only possible to a limited extent in the prior art.

In one embodiment, the valve closing body is spherical, wherein the valve closing body is divided by an imaginary equator into a first and a second half, wherein the equator is oriented orthogonally to a longitudinal axis of the interior space, wherein the longitudinal axis extends centrally from the valve inlet to the valve outlet, wherein a surface of the first half, which is arranged upstream of the second half in a conveying direction counter to the blocking direction, is the flow-facing region of the valve closing body, and a surface of the second half is the non-flow-facing region of the valve closing body.

In particular, spherical valve closing bodies in check valves according to the prior art have regions that are loaded with a low wall shear stress since, although the fluid flows around the valve closing body, it does not flow against all surface portions of the valve closing body equally tangentially, but almost no wall shear stress acts in particular in the region of the pole of the non-flow-facing region. If the element reducing the flow cross-section is now arranged in such a way that the fluid is also directed onto surface portions of the non-flow-facing region, a cleaning of the valve closing body is achieved that meets special hygienic requirements, for example in the food industry or medical technology.

In a further embodiment, the non-flow-facing region is composed of a plurality of surface portions of the surface of the valve closing body, wherein a sum of the surface portions of the non-flow-facing region having a wall shear stress<25% of the average wall shear stress of the flow-facing region of the surface is at most 25% of a total surface area of the surface of the valve closing body. In other words, the quantitative surface proportion of the surface portions of the non-flow-facing region that do not experience sufficient wall shear stress for cleaning is <25% of the total surface area of the valve closing body. Sufficient cleaning of the valve closing body can thus be ensured overall.

In a further embodiment, the element reducing the flow cross-section reduces the flow cross-section of the check valve in the area of the element reducing the flow cross-section by at least 25%, preferably by at least 40%, compared to an opening cross-section of the valve seat when the valve closing body is arranged in the open position.

In a further embodiment, the valve housing comprises an interior space that is cylindrically formed at least in sections, wherein the valve closing body is arranged in the cylindrical portion of the interior space, wherein the element reducing the flow cross-section extends radially into the interior space of the valve housing. Cylindrical configurations of the interior space of the valve housing in which the fluid flows offer the advantage that no deposits can form on edges of the interior space.

In particular, the element reducing the flow cross-section has a bottom side facing the valve closing body, wherein the bottom side is at an angle of less than 90°, preferably less than 60°, to a longitudinal axis of the cylindrical portion of the interior space, wherein the angle between the bottom and the longitudinal axis is defined in such a way that it is on a side of the bottom side that faces the valve inlet and is, when viewed from the bottom side, before a point of intersection of an imaginary extension of the bottom side, preferably an imaginary tangential extension of the bottom side, with the longitudinal axis.

If one again considers the coordinate system that was previously discussed in connection with the non-flow-facing regions and the flow-facing regions and the first and second quadrants of which are arranged upstream of the third and fourth quadrants in the conveying direction, the claimed angle is in the fourth quadrant of the coordinate system, provided the point of intersection of the bottom side with the longitudinal axis is assumed as the origin of the coordinate system. By the lower limit claimed for the angle, the fluid is particularly advantageously directed around the valve closing body, and the cleaning effect is improved.

Furthermore, in one embodiment, the bottom side is concavely curved with a radius R, wherein the radius R is preferably ≥3 mm, preferably ≥6 mm, and more preferably ≥6.35 mm, wherein a tangent, preferably any tangent, at the curved bottom side encloses an angle of less than 90°, preferably less than 60°, with the longitudinal axis, wherein the angle between the tangent and the longitudinal axis is defined in such a way that it is on a side of the tangent that faces the valve inlet and is, when viewed from the tangent, before a point of intersection of the tangent with the longitudinal axis. In other words, the definition of the angle between tangent and longitudinal axis is analogous to the definition of the angle between the bottom side and longitudinal axis in the previous exemplary embodiment. This results in the advantage that, both during the cleaning of the check valve and during the actual operation, no residue can accumulate in any corners that are difficult to clean and, in the case of cleaning agent accumulating, could lead to contamination of the products to be processed, such as the food product.

In a further embodiment, the element reducing the flow cross-section comprises a plurality of, preferably four, sub-elements arranged equidistantly in the circumferential direction of the cylindrical portion of the interior space. The equidistant arrangement purposefully improves the guiding of the fluid around the valve closing body and thus the cleaning of the non-flow-facing region of the valve closing body.

The object underlying the present invention is furthermore achieved by a device for conveying a fluid having at least one check valve previously described, wherein the fluid is preferably a liquid food product. In particular, the device is understood to mean a pump, e.g., a metering pump, which conveys defined amounts of a fluid.

The fluid conveyed with the device is not necessarily the fluid used to clean the valve closing body. Rather, any fluid, in particular liquids, such as milk or honey, may be conveyed with such a device or a device having a check valve according to the invention.

The problem underlying the invention is furthermore solved by a method of cleaning a check valve arranged in a device, preferably a metering pump for metering a fluid, wherein the method comprises the steps of:

A) providing the device with the check valve, wherein the check valve comprises a valve housing having an inlet and an outlet for the fluid, a valve seat having a sealing surface and an opening stop opposite the valve seat, wherein a valve closing body movable relative to the valve housing and having a surface is arranged in the valve housing between the valve seat and the opening stop, wherein the valve closing body can reciprocate relative to the valve housing between a closed position, in which the valve closing body is engaged with the sealing surface of the valve seat, and an open position, in which the valve closing body is engaged with the opening stop, wherein the valve closing body seals the check valve when fluid flows through the check valve in a blocking direction in that the valve closing body sealingly engages with the sealing surface of the valve seat, B) impinging the device and thus the check valve with a fluid counter to the blocking direction so that the valve closing body is brought into engagement with the opening stop so that a non-flow-facing region of the surface of the valve closing body experiences an average wall shear stress of at least 50% compared to an average wall shear stress of a flow-facing region of the surface of the valve closing body, wherein the flow-facing region is arranged upstream of the non-flow-facing region of the valve closing body in a conveying direction counter to the blocking direction of the fluid.

In one embodiment, the device is impinged with a substantially temporally constant fluid stream. This offers the advantage that the same wall shear stresses always act on the valve closing body after a start phase of the cleaning process so that any contaminations are continuously removed.

Further advantages, features, and configurations of the present invention are illustrated in the following description of an embodiment of the present invention. The same components are marked with the same reference signs.

FIG. 1 shows a schematic representation of an embodiment of the check valve installed in a device for metering a fluid, said check valve being in a closed position.

FIG. 1a shows the angle α between the tangent 51 of the concave bottom side 17a and the longitudinal axis 50 and the radius R of the concave bottom side 17a.

Figure 1A:
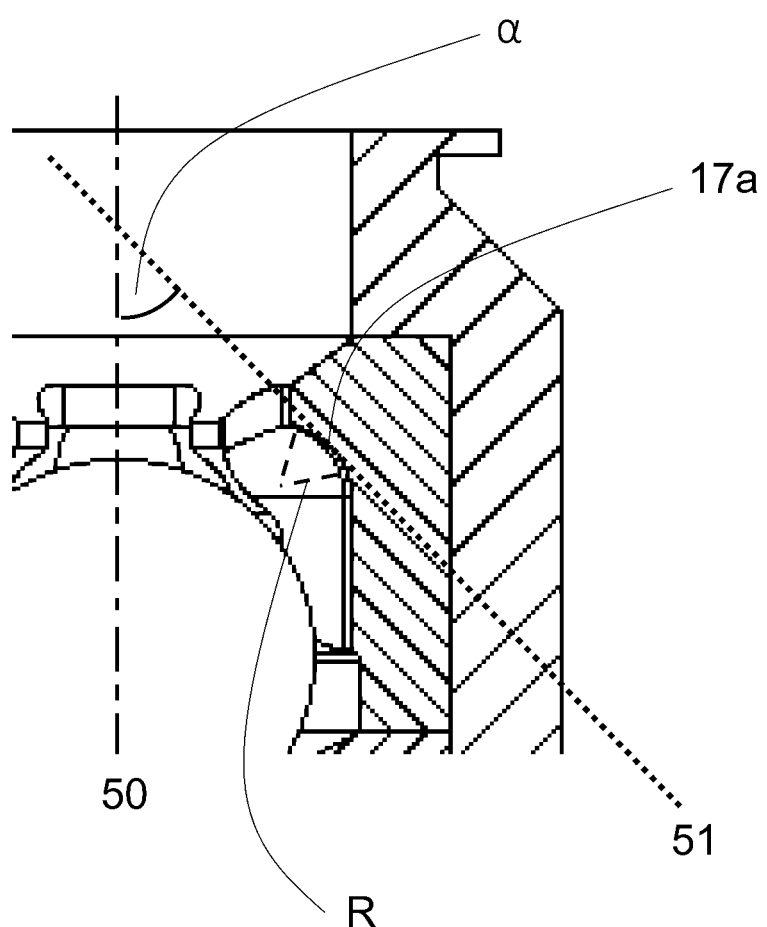
FIG. 1b shows an embodiment in which the bottom side 17a is flat and encloses an angle α with the longitudinal axis 50.
Figure 1B:
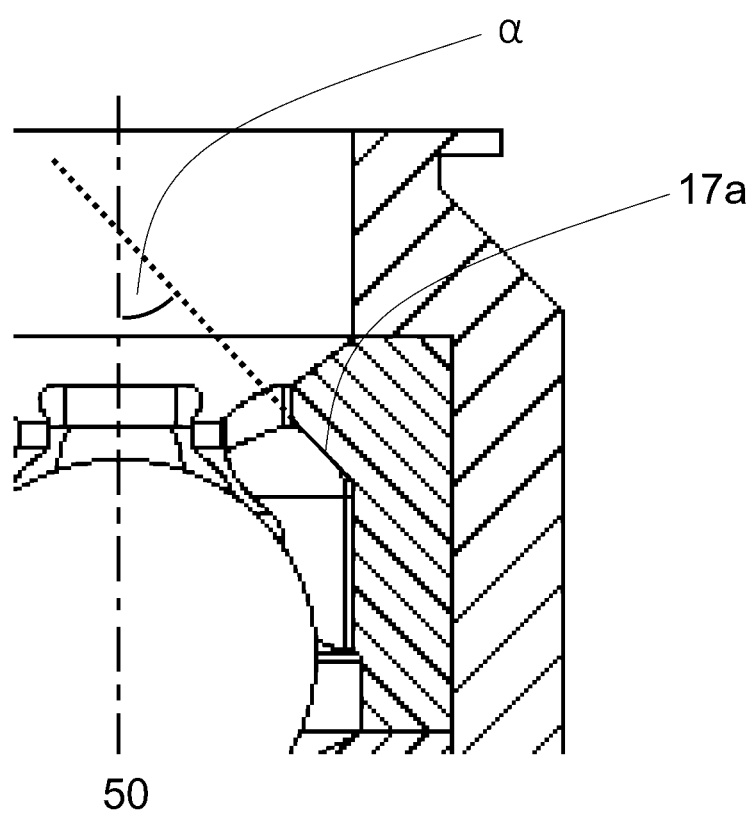

FIG. 1 shows a device 1 in which an embodiment of the check valve 10 according to the invention is installed. The check valve 10 has an inlet 12 as well as an outlet 13 and a valve housing 11 through which a fluid can be conveyed through the check valve 10 in a conveying direction 101 counter to the blocking direction 100, whereas the check valve 10 interrupts the conveyance of the fluid when the fluid is moved through the check valve 10 in the blocking direction 100.

For this purpose, the check valve 10 comprises a valve seat 14, which in turn has a sealing surface 14a. The check valve 10 furthermore comprises an opening stop 15 opposite the valve seat 14, wherein a valve closing body 16 is arranged in the valve housing 11 between the valve seat 14 and the opening stop 15.

Figure 2:
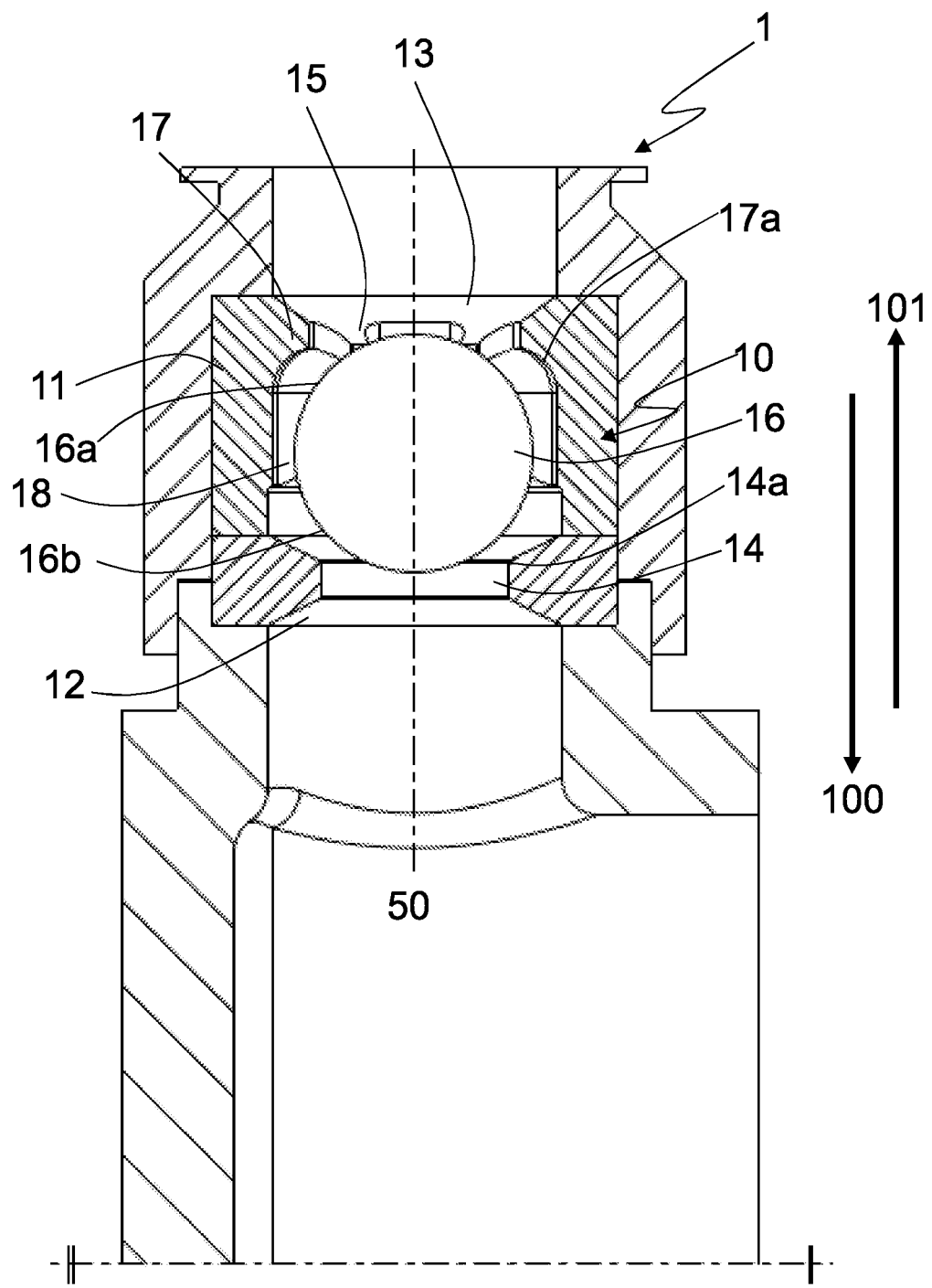
FIG. 2 shows a schematic representation of the embodiment shown in FIG. 1, wherein the check valve is in its open position.

The valve closing body 16 can reciprocate relative to the valve housing 11 between a closed position, which is shown in FIG. 1 and in which the valve closing body 16 is engaged with the sealing surface 14a of the valve seat 14, and an open position, which is shown in FIG. 2 and in which the valve closing body 16 is engaged with the opening stop 15.

Furthermore, the valve closing body is spherical and arranged in an interior space 18 of the valve housing 11, which is cylindrical in sections. An element 17 reducing the flow cross-section extends radially into the interior space 18 of the valve housing 11 and consists of a plurality of sub-elements (see FIG. 3).

The element 17 reducing the flow cross-section furthermore has a bottom side 17a, which is concavely curved with a radius R of 6.35 mm. An imaginary tangential extension 51 of the concavely curved bottom 17a extends at an angle of 60° to a longitudinal axis 50 of the cylindrical portion of the interior space 18. Any tangent of the concavely curved bottom side 17a therefore encloses a maximum angle of 60° with the longitudinal axis 50 of the interior space 18.

Figure 3:
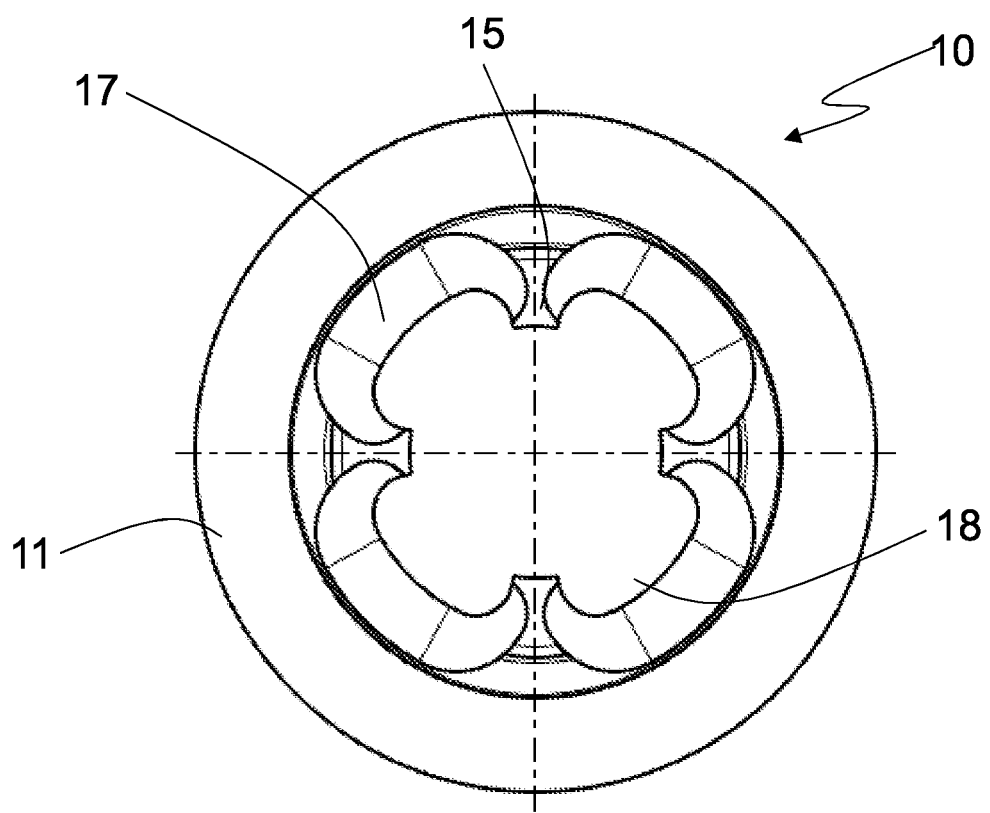
FIG. 3 shows a schematic representation of a cross-section of the embodiment of the check valve according to the invention shown in FIGS. 1 and 2 in the area of the element reducing the flow cross-section.

FIG. 3 again shows a plan view of a cross-section of the check valve 10, wherein the valve closing body 16 is not shown in the interior space 18 in this illustration. FIG. 3 clearly shows that the element 17 reducing the flow cross-section consists of four sub-elements arranged equidistantly in the circumferential direction around a cylindrical portion of the interior space 18 of the check valve 10 so that, together with the opening stop 15, a cloverleaf structure results. Whereas the opening stop 15 projects further into the interior space 18 of the valve housing 11, the element 17 reducing the flow cross-section ensures that sufficient fluid can still flow through the check valve 10, wherein, as a result of the guidance of the fluid, the fluid at the same time flows against the valve closing body 16 in a manner sufficient for cleaning.

At the closed position of the check valve 10 shown in FIG. 1, the valve closing body 16 is sealingly engaged with the sealing surface 14a of the valve seat 14 as a result of the fluid flowing through the check valve 10 in a blocking direction 100, so that the check valve 10 is sealed and fluid cannot penetrate through the check valve 10.

On the other hand, if a fluid, for example a cleaning agent, flows through the check valve with a temporally constant fluid stream counter to the blocking direction 100, the valve closing body 16 moves into its open position, in which it is engaged with the opening stop 15, and remains there. The open position of the check valve 10 is shown in FIG. 2.

If the valve closing body 16 is in its open position and a cleaning agent flows through the check valve 10 counter to the blocking direction 100, a flow-facing region 16b and a non-flow-facing region 16a can be defined for the valve closing body 16, wherein the flow-facing region 16b is arranged before the non-flow-facing region 16a of the valve closing body in the conveying direction 101 of the fluid counter to the blocking direction 100.

The configuration of the elements 17 reducing the flow cross-section results in the flowing fluid flowing around the valve closing body 16 in such a way that the non-flow-facing region 16a of the surface of the valve closing body 16 experiences at least an average wall shear stress of 50% compared to an average wall shear stress of the flow-facing region 16b of the surface of the valve closing body.

In this way, the non-flow-facing region 16a of the surface of the valve closing body 16, which is engaged with the opening stop 15, is also adequately cleaned. In addition, the elements 17 reducing the flow cross-section do not affect the conveyance of a fluid when the device is operated in normal operation, for example for metering a food product.

REFERENCE SIGNS

1 Device
10 Check valve
11 Valve housing
12 Inlet
13 Outlet
14 Valve seat
14a Sealing surface
15 Opening stop
16 Valve closing body
16a Non-flow-facing region
16b Flow-facing region
17 Element reducing the flow cross-section
17a Bottom side
18 Interior space
50 Longitudinal axis
51 tangential extension
100 Blocking direction
101 Conveying direction

The invention claimed is:

1. A check valve (10) having a valve housing (11), wherein the valve housing (11) comprises an inlet (12) and an outlet (13) for a fluid, a valve seat (14) having a sealing surface (14a) and an opening stop (15) opposite the valve seat (14), wherein a valve closing body (16) having a surface is arranged in an interior space (18) of the valve housing (11) between the valve seat (14) and the opening stop (15), wherein the valve closing body (16) can reciprocate relative to the valve housing (11) between a closed position, in which the valve closing body (16) is engaged with the sealing surface (14a) of the valve seat (14), and an open position, in which the valve closing body (16) is engaged with the opening stop (15), wherein the valve closing body (16) seals the check valve (10) when fluid flows through the check valve (10) in a blocking direction (100) in that the valve closing body (16) sealingly engages with the sealing surface (14a) of the valve seat (14), characterized in that an element (17) reducing the flow cross-section is provided in a region of the opening stop (15) in addition to the opening stop (15) so that, when the valve closing body (16) is in the open position and the fluid flows through the check valve (10) counter to the blocking direction (100), a non-flow-facing region (16a) of the surface of the valve closing body (16) has at least an average wall shear stress of 50% compared to an average wall shear stress of a flow-facing region (16b) of the surface of the valve closing body (16);

wherein the interior space (18) is cylindrically formed at least in sections, wherein the valve closing body (16) is arranged in the cylindrical portion of the interior space (18) in a closed position and in an open position of the check valve (10), wherein the element (17) reducing the flow cross-section extends radially into the interior space (18) of the valve housing.

2. The check valve (1) according to claim 1, wherein the valve closing body (16) is spherical, wherein the valve closing body (16) is divided by an imaginary equator into a first and a second half, wherein the equator is oriented orthogonally to a longitudinal axis (50) of the interior space (18) of the valve housing (11), wherein the longitudinal axis (50) extends centrally from the valve inlet (12) to the valve outlet (13), wherein a surface of the first half, which is arranged upstream of the second half in a conveying direction (101) counter to the blocking direction (100), is the flow-facing region (16b) of the valve closing body (16), and a surface of the second half is the non-flow-facing (16a) region of the valve closing body (16).

3. The check valve (10) according to claim 1, wherein the non-flow-facing region is composed of a plurality of surface portions of the surface of the valve closing body (16), wherein a sum of the surface portions of the non-flow-facing region (14a) having a wall shear stress of less than 25% of the average wall shear stress of the flow-facing region (14b) of the surface is at most 25% of a total surface area of the surface of the valve closing body (16).

4. The check valve (10) according to claim 1, wherein the element (17) reducing the flow cross-section reduces the flow cross-section of the check valve (10) in the area of the element (17) reducing the flow cross-section by at least 25% compared to an opening cross-section of the valve seat (14) when the valve closing body (16) is arranged in the open position.

5. The check valve (10) according to claim 1, wherein the element (17) reducing the flow cross-section has a bottom side (17a) facing the valve closing body (16), wherein the bottom side (17a) is at an angle of less than 90° to a longitudinal axis (50) of the cylindrical portion of the interior space (18), wherein the angle between the bottom side (17a) and the longitudinal axis (50) is defined in such a way that it is on a side of the bottom side (17a) that faces the valve inlet (12) and is, when viewed from the bottom side (17a), in front of an imaginary point of intersection of an extension of the bottom side (17a) with the longitudinal axis (50).

6. The check valve (10) according to claim 5, wherein the angle formed between the bottom side (17a) and the longitudinal axis (50) of the cylindrical portion of the interior space (18) is less than 60°.

7. The check valve (10) according to claim 5, wherein the bottom side (17a) is concavely curved with a radius R, wherein a tangent at the curved bottom side (17a) encloses an angle of less than 90° with the longitudinal axis (50), wherein the angle between the tangent and the longitudinal axis (50) is defined in such a way that it is on a side of the tangent that faces the valve inlet (12) and is, when viewed from the tangent, before a point of intersection of the tangent with the longitudinal axis (50).

8. The check valve (10) according to claim 7, wherein the radius R is greater than or equal to 3 mm.

9. The check valve (10) according to claim 8, wherein the radius R is greater than or equal to 6 mm.

10. The check valve (10) according to claim 9, wherein the radius R is greater than or equal to 6.35 mm.

11. The check valve (10) according to claim 7, wherein any tangent at the curved bottom side (17a) encloses an angle of less than 90° with the longitudinal axis (50).

12. The check valve (10) according to claim 11, wherein any tangent at the curved bottom side (17a) encloses an angle of less than 60° with the longitudinal axis (50).

13. A check valve (10) according to claim 1, wherein the element (17) reducing the flow cross-section comprises a plurality of sub-elements arranged equidistantly in the circumferential direction of the cylindrical portion of the interior space (18).

14. The check valve (10) according to claim 13, wherein the element (17) reducing the flow cross-section comprises four sub-elements.

15. A device (1) for conveying a fluid, having at least one check valve (10) according to claim 1.

16. The device (1) according to claim 15, wherein the fluid is a liquid food product.

17. The device according to claim 15, wherein the device is a metering pump for metering a fluid.

18. A method of cleaning a check valve (10) arranged in a device (1), with the steps of:
  a. providing the device (1) with the check valve (10), wherein the check valve (10) comprises a valve housing (11) having an inlet (12) and an outlet (13) for the fluid, a valve seat (14) having a sealing surface (14a) and an opening stop (15) opposite the valve seat (14), wherein a valve closing body (16) movable relative to the valve housing (11) and having a surface is arranged in an interior space (18) of the valve housing (11) between the valve seat (14) and the opening stop (15), wherein the valve closing body (16) can reciprocate relative to the valve housing (11) between a closed position, in which the valve closing body (16) is engaged with the sealing surface (14a) of the valve seat (14), and an open position, in which the valve closing body (16) is engaged with the opening stop (15), wherein the valve closing body (16) seals the check valve (10) when fluid flows through the check valve (10) in a blocking direction (100) in that the valve closing body (16) sealingly engages with the sealing surface (14a) of the valve seat (14), wherein an element (17) reducing the flow cross-section is provided in a region of the opening stop (15) in addition to the opening stop (15), wherein the interior space (18) is cylindrically formed at least in sections, wherein the valve closing body (16) is arranged in the cylindrical portion of the interior space (18) in a closed position and in an open position of the check valve, wherein the element (17) reducing the flow cross-section extends radially into the interior space (18) of the valve housing;
  b. impinging the device (1) and thus the check valve (10) with a fluid counter to the blocking direction (100) so that the valve closing body (16) engages with the opening stop (15) so that a non-flow-facing region (16a) of the surface of the valve closing body (16) experiences an average wall shear stress of at least 50% compared to an average wall shear stress of a flow-facing region (16b) of the surface of the valve closing body (16), wherein the flow-facing region (16b) is arranged upstream of the non-flow-facing region (16a)

of the valve closing body (16) in a direction counter to the blocking direction (100).

19. The method according to claim 18, wherein the device (1) is impinged with a substantially temporally constant fluid stream.

* * * * *